United States Patent
Jordy et al.

(10) Patent No.: US 6,673,483 B2
(45) Date of Patent: Jan. 6, 2004

(54) SEALED STORAGE CELL WITH AN IMPROVED RECOMBINATION DEVICE

(75) Inventors: Christian Jordy, St Louis de Montferrand (FR); Thierry Berlureau, Bordeaux (FR); Jean-Louis Liska, St Medard en Jalles (FR)

(73) Assignee: Alcatel, Paris (FR)

( * ) Notice: Subject to any disclaimer, the term of this patent is extended or adjusted under 35 U.S.C. 154(b) by 266 days.

(21) Appl. No.: 09/974,858

(22) Filed: Oct. 12, 2001

(65) Prior Publication Data
US 2002/0068216 A1 Jun. 6, 2002

(30) Foreign Application Priority Data
Oct. 16, 2000 (FR) ............................................. 00 13214

(51) Int. Cl.⁷ ...................... H01M 10/52; H01M 10/30; H01M 2/16
(52) U.S. Cl. ...................... 429/58; 429/129; 429/218.2; 429/247; 429/250
(58) Field of Search ............................ 429/8, 123, 129, 429/146, 147, 152, 161, 206, 218.2, 223, 246, 247, 250, 58

(56) References Cited

U.S. PATENT DOCUMENTS

| | | | | |
|---|---|---|---|---|
| 2,842,607 A | * | 7/1958 | Germershausen et al. | .... 429/59 |
| 3,023,258 A | * | 2/1962 | Peters | ........................ 429/59 |
| 3,119,722 A | * | 1/1964 | Tietze et al. | .................. 429/59 |
| 4,115,630 A | * | 9/1978 | Van Ommering et al. | ..... 429/72 |
| 5,364,713 A | | 11/1994 | Von Benda et al. | |
| 5,447,806 A | | 9/1995 | Hoge et al. | |
| 5,576,116 A | | 11/1996 | Sanchez et al. | |
| 5,658,694 A | | 8/1997 | Charkey | |
| 5,780,184 A | * | 7/1998 | Coco et al. | ................. 429/217 |
| 5,789,097 A | | 8/1998 | Kistrup et al. | |
| 6,183,899 B1 | * | 2/2001 | Sanchez et al. | ............... 429/53 |

FOREIGN PATENT DOCUMENTS

| FR | 2 766 973 | 2/1999 |
|---|---|---|
| WO | WO 01/01509 A1 | 1/2001 |

OTHER PUBLICATIONS

Patent Abstracts of Japan vol. 010, No. 117 (E–400), May 2, 1986 & JP 60 250567 A (Yuasa Denchi KK), Dec. 11, 1985.
Patent Abstracts of Japan vol. 1998, No. 10, Aug. 31, 1998 & JP 10 125313 A (Sanyo Electric Co Ltd.), May 15, 1998.

* cited by examiner

Primary Examiner—Patrick Ryan
Assistant Examiner—Tracy Dove
(74) Attorney, Agent, or Firm—Sughrue Mion, PLLC

(57) ABSTRACT

An aqueous alkaline electrolyte Ni-MH sealed secondary storage cell includes a bundle of electrodes placed in a container and made up of a plurality of negative and positive electrodes. The space separating the negative electrode from the positive electrode contains a separator. The separator is permeable to gases and a recombination device is placed between two adjacent negative electrodes and has a wetting angle of at least 45°, an average pore section of at least $10^3$ $\mu m^2$, and a thickness from 0.2 mm to 5 mm.

9 Claims, 4 Drawing Sheets

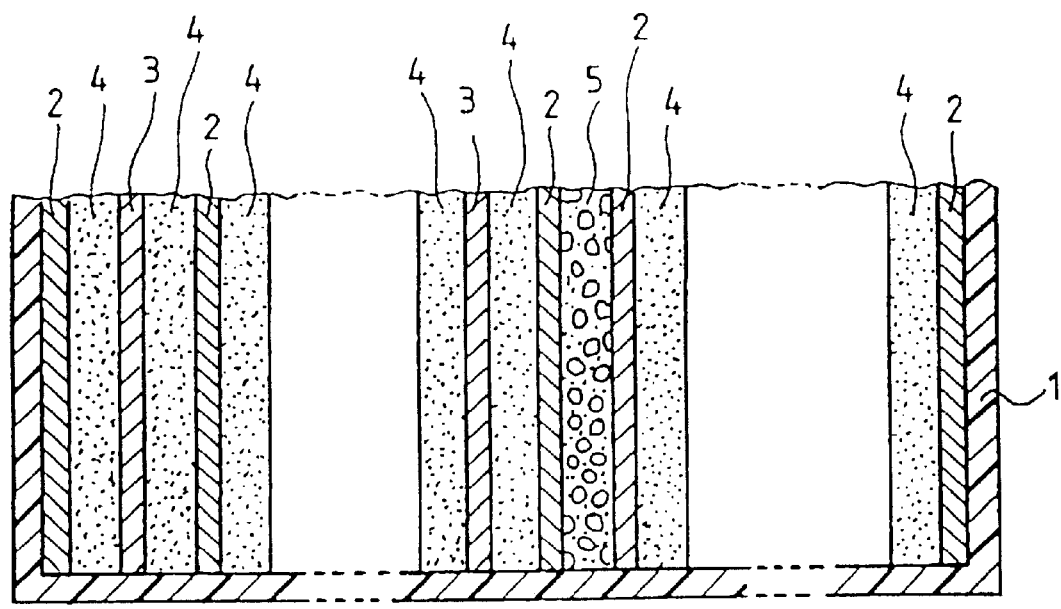
FIG_1

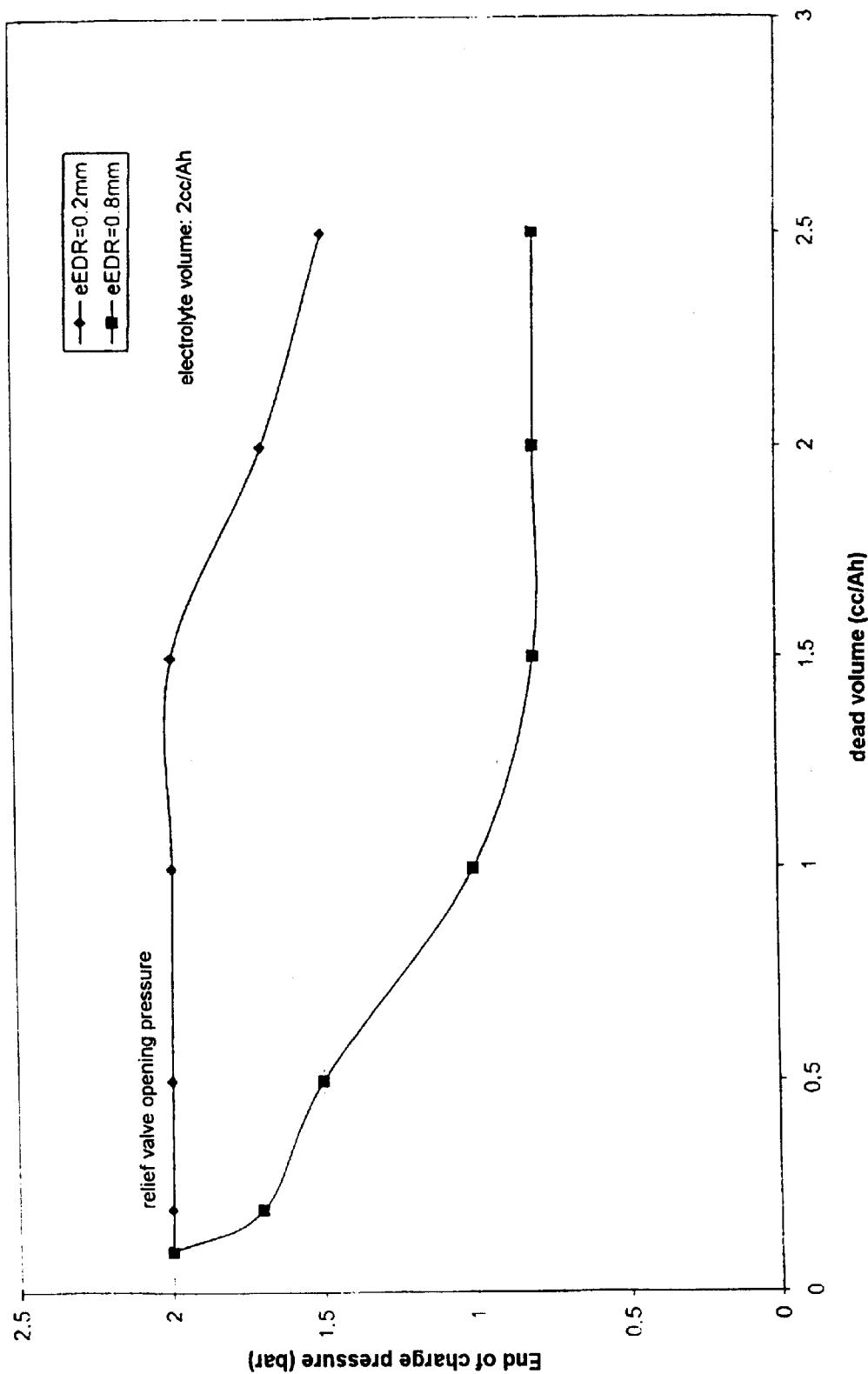
FIG_2

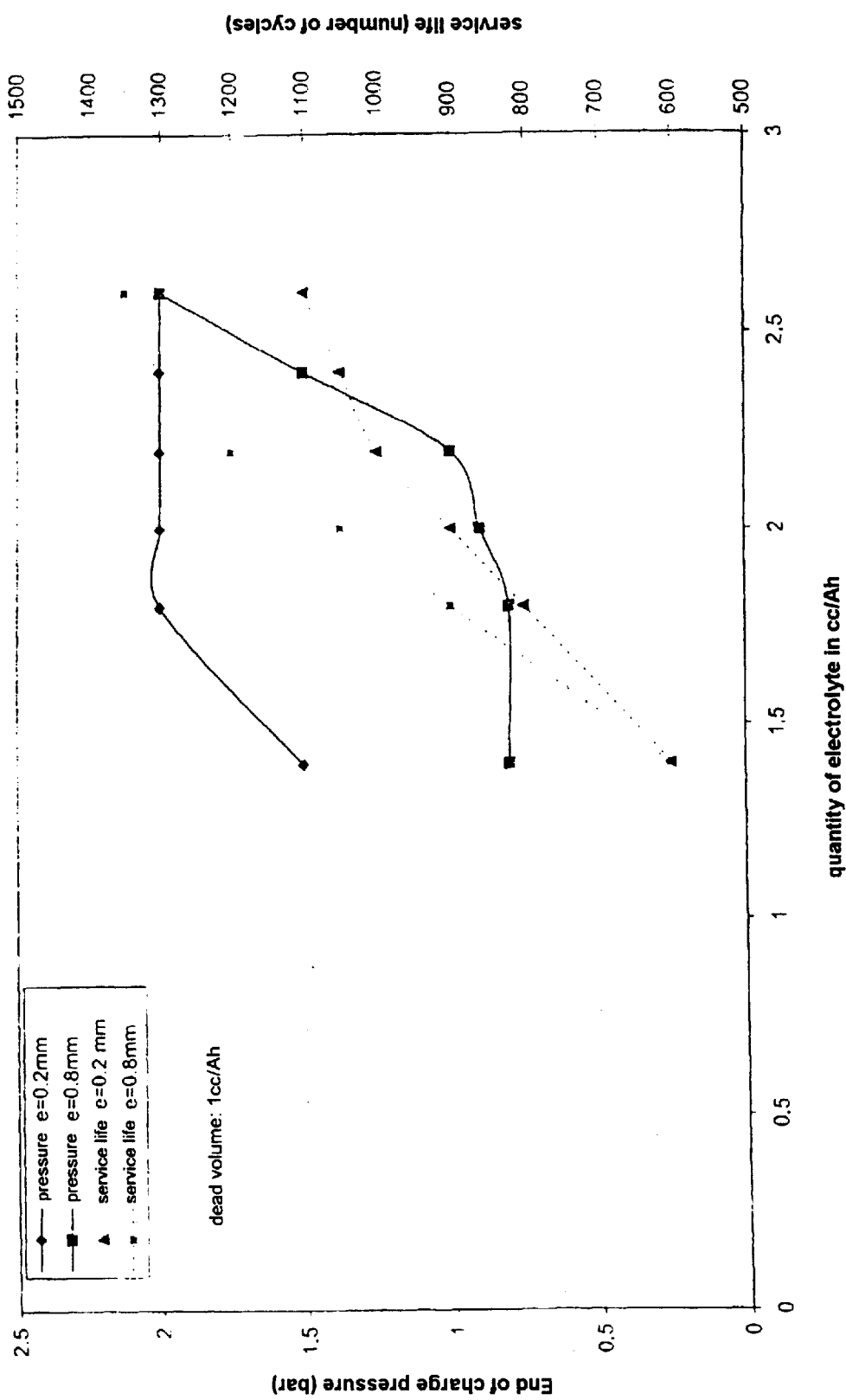
FIG_3

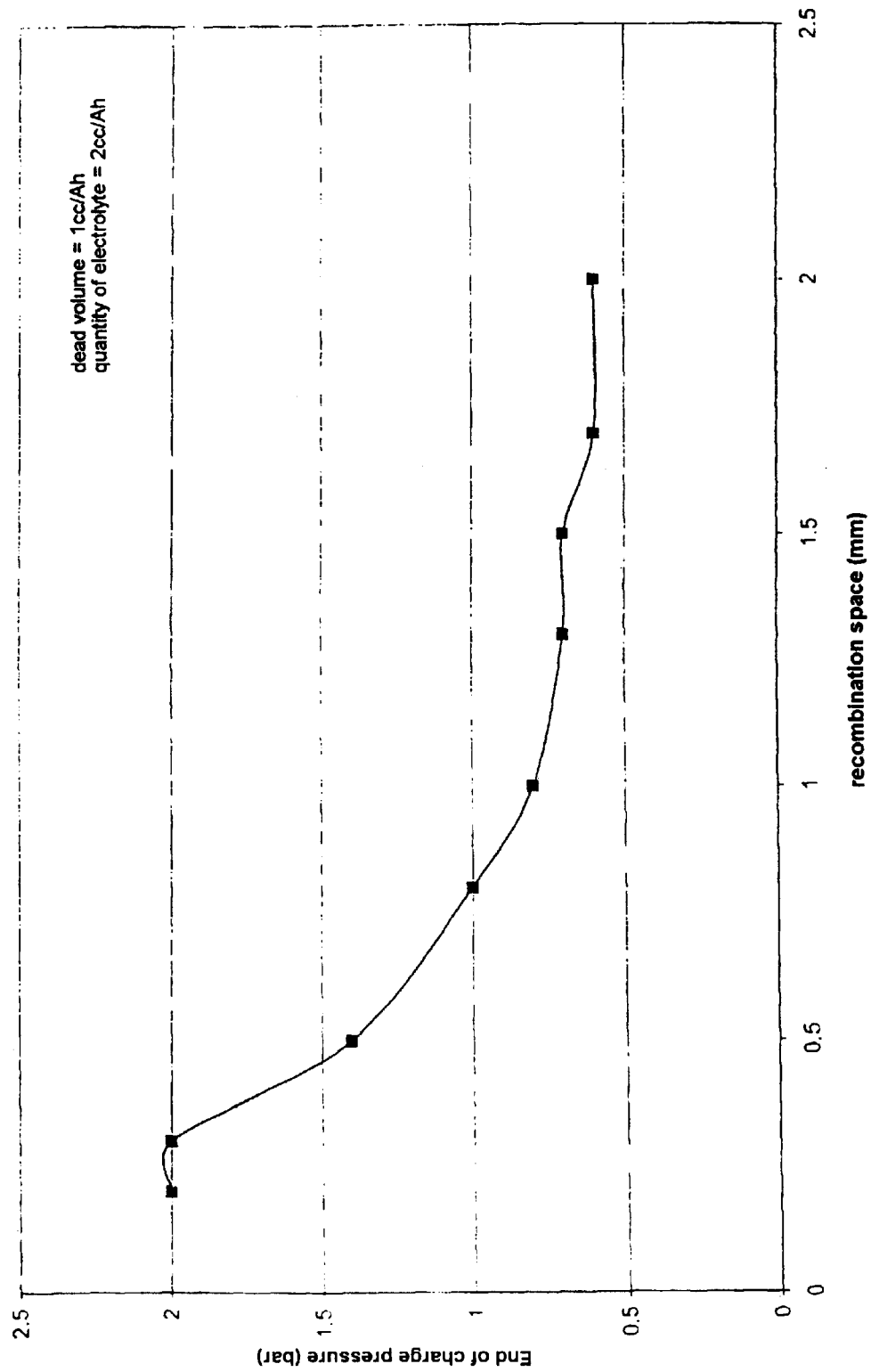
FIG_4

SEALED STORAGE CELL WITH AN IMPROVED RECOMBINATION DEVICE

CROSS-REFERENCE TO RELATED APPLICATIONS

This application is based on French Patent Application No. 00 13 214 filed Oct. 16, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to an aqueous alkaline electrolyte Ni-MH sealed secondary storage cell of high capacity and low internal pressure, including a bundle of electrodes placed in a container and made up of a plurality of negative and positive electrodes, the space separating the negative electrode from the positive electrode containing a separator, in which cell a recombination device is placed between two adjacent negative electrodes.

2. Description of the Prior Art

Aqueous alkaline electrolyte storage cells include Ni-MH cells, i.e. nickel and hydridable metal alloy or metal cells. Industrial sealed storage cells have a high capacity, from 5 Ah to 400 Ah.

In storage cells, electrochemical reduction (recombination) of the oxygen produced by the positive electrode on overcharging occurs at the surface of the negative electrodes. In industrial storage cells, the low permitted pressures, typically less than 2 bar, and the higher inter-electrode distance, as well as a greater quantity of electrolyte, mean that direct recombination only at the negative electrodes facing the positive electrodes is insufficient. Recombination devices are therefore provided at the negative electrodes to accelerate recombination.

The documents FR-1 243 784, U.S. Pat. No. 3,023,258 and U.S. Pat. No. 5,447,806 describe recombination devices in the form of spacers between two negative half-electrodes, that spacer allowing oxygen which is evacuated into the space at the top of the cell (and which causes the overpressure) to recombine on the surfaces defined by the spacer. In the case of the document U.S. Pat. No. 5,447,806 in particular, which is specifically devoted to Ni-MH storage cells, the spacer is formed by a porous metal or plastics material structure. According to the documents FR-1 243 784 and U.S. Pat. No. 3,023,258, which are older (and therefore relate to alkaline storage cells but not specifically to Ni-MH cells), the spacer is made of nickel, for example. In the document U.S. Pat. No. 5,447,806 the separators used are impermeable to gases.

Storage cells of the type constituting the subject matter of the document U.S. Pat. No. 5,447,806 suffer from numerous defects.

The (gas-impermeable) separators used have a much higher resistivity than highly porous separators (such as non-woven materials, for example, for which the resistivity for the same thickness is of the order of one fifth).

For industrial Ni-MH storage cells developed for electric vehicle applications, for example, the characteristics of these prior art storage cells cannot achieve pressures lower than the relief valve opening pressure (<3 bar) and therefore necessitate maintenance (regular topping up with water); the reason for this is that the conditions described in the document U.S. Pat. No. 5,447,806 cannot achieve low pressures for small dead volumes (to increase the energy per unit volume) and high quantities of electrolyte (to increase service life).

An object of the invention is to provide a maintenance-free Ni-MH secondary storage cell with a relief valve that opens at a very low pressure (in particular less than 3 bar), a small dead volume (to optimize the energy per unit volume), and a high quantity of electrolyte (for a high service life).

This object is achieved by using a hydrophobic and porous recombination device of minimum thickness.

SUMMARY OF THE INVENTION

The invention therefore provides an aqueous alkaline electrolyte Ni-MH sealed secondary storage cell including a bundle of electrodes placed in a container and made up of a plurality of negative and positive electrodes, the space separating the negative electrode from the positive electrode containing a separator, in which cell the separator is permeable to gases and a recombination device is placed between two adjacent negative electrodes and has a wetting angle of at least 45°, an average pore section of at least $10^3 \mu m^2$, and a thickness from 0.2 mm to 5 mm.

In one embodiment the wetting angle of the recombination device is at least 60°.

In one embodiment the thickness of the recombination device is from 0.3 mm to 2 mm.

In one embodiment the recombination device is made of polyethylene or polypropylene.

In one embodiment the recombination device is non-conductive.

In one embodiment the recombination device is surface-treated with PTFE.

In one embodiment the cell has an operating pressure less than 2 bar.

In one embodiment the cell has a dead volume less than 2 cc/Ah.

In one embodiment the cell has a quantity of electrolyte greater than 1.8 cc/Ah.

In one embodiment the cell has a capacity per unit volume greater than 100 Ah/l.

Other features and advantages of the invention will emerge from the following description, which is given with reference to the accompanying drawings.

BRIEF DESCRIPTION OF THE DRAWINGS

FIG. 1 is a diagram showing a storage cell in accordance with the invention.

FIG. 2 shows the end of charge pressure as a function of the dead volume.

FIG. 3 shows the end of charge pressure as a function of the quantity of electrolyte.

FIG. 4 shows the end of charge pressure as a function of the thickness of the recombination device.

DETAILED DESCRIPTION OF THE PREFERRED EMBODIMENT

Referring to FIG. 1, a storage cell in accordance with the invention includes a plurality of negative electrodes 2 and positive electrodes 3 in a container 1. The electrodes are separated by a separator 4. A recombination device 5 is placed between two negative electrodes 2. A storage cell in accordance with the invention generally comprises n positive electrodes (n≧2), p recombination devices (p≧1), and q negative electrodes (q≧n+p+1), and each recombination device is placed between two negative electrodes.

In the example shown, there are eight positive electrodes, ten negative electrodes, and one central recombination device. If more than one device is provided, they are distributed appropriately.

The positive electrode is conventional. It is generally formed by a conductive foam support, for example based on Co or Ni and an active material based on $Ni(OH)_2$ (in particular of spherical form) possibly containing (syn) crystallized Zn and/or Co. Its thickness is conventional.

The negative electrode is conventional. It is generally formed of a hydridable alloy, for example based on Mischmetal Mm, Ni, Mn, Al and Co, or a hydridable metal, generally associated with carbon powder. The current collector is a perforated nickel-plated steel strip, for example. Its thickness is conventional.

The inter-electrode distance is from 0.15 to 0.60 mm, for example.

The separator is permeable to gases (for example its permeability is at least 1 $cc/s/m^2$). It is made from a non-woven material, for example, based on a polymer, in particular on a polyolefin. A treatment can be applied if necessary. The separator can have a mass per unit surface area from 30 to 100 $g/m^2$. The separator can include two or more non-woven sublayers, for example. Its thickness is conventional.

The electrolyte used in the storage cell according to the invention is conventional. It is an aqueous solution of sodium hydroxide, potassium and lithium hydroxide, for example.

The recombination device includes a hydrophobic material having a porous structure and an appropriate thickness.

The hydrophobicity is characterized by the wettability of the electrolyte, which is preferably such that the wetting angle (or angle of contact between the surface of the recombination device and the electrolyte) is greater than 45°, preferably greater than 60°. To determine the wetting angle, the surface is cleaned with 1.30 density potassium hydroxide, dried at room temperature and measured using 1.30 density potassium hydroxide. For example, polyethylene (like polypropylene) has a contact angle of 70°, which can be increased to 90° by hydrophobic surface treatment. Inappropriate materials include PVC, for example (contact angle approximately 43°), nickel (contact angle less than 10°), and carbon, whose contact angle is very much less than 45°. The surface treatment to render the material hydrophobic can include the application of polytetrafluoroethylene (PTFE).

The material from which the recombination device is made can be conductive or non-conductive; it is preferably a plastics material. In particular, it can be a polyolefin such as polyethylene (for example high-density polyethylene) or polypropylene.

The porous structure (open pores) is characterized by an average pore section. The average pore section is preferably at least $10^3$ $\mu m^2$, for example around 3.5 $mm^2$.

The thickness is from 0.2 to 5 mm, for example, preferably from 0.3 to 2 mm.

The characteristics of the recombination space mentioned above, even with a high quantity of electrolyte and a very small dead volume, prevent that space filling with electrolyte (filling the pores of the recombination space would very greatly reduce the access to the oxygen and would therefore lead to a pressure rise greater than the pressure at which the relief valve opens).

With the invention, a maintenance-free storage cell is obtained (i.e. one with no need to top up the water regularly), having a low operating pressure (less than 3 bar, and for example from 1 to 2 bar), a high capacity (more than 5 Ah, and for example from 10 to 500 Ah), a high capacity per unit volume (more than 100 Ah/l, and in particular from 100 to 250 Ah/l), a small dead volume and a high quantity of electrolyte.

The dead volume, defined as being equal to the total internal volume of the storage cell less the sum of the volumes of the components and the electrolyte, is less than 2 cc/Ah, for example, in particular from 0.5 to 1.5 cc/Ah. This small dead volume optimizes the energy per unit volume.

The quantity of electrolyte is greater than 1.8 cc/Ah, for example, and in particular from 1.8 to 2.5 cc/Ah. A high quantity of electrolyte guarantees a long service life, typically of more than 1 000 cycles.

The storage cells in accordance with the invention are conventionally prism-shaped (parallelepiped-shaped, with plane electrodes).

The storage cells in accordance with the invention find applications in varied fields such as electrical vehicles, aeronautics, stationary traction, railroads, etc.

The invention is illustrated by the following non-limiting examples.

EXAMPLE

A sealed 25 Ah storage cell was constructed comprising eight positive electrodes, ten negative electrodes and a recombination space (RCS) distributed as follows:

/–/s/+/s/–/s/+/s/–/s/+/s/–/s/+/s/–/RCS/–/s/+/s/–/s/+/s/–/s/+/s/–/s/+/s/–/

/+/: the positive electrodes were made of nickel and cobalt hydroxide and a nickel foam support.

/–/: the negative electrodes were made of a hydridable alloy based on Mm, Ni, Mn, Al and Co in powder form associated with carbon powder.

/s/: the separator was a two-layer non-woven material based on hydrophilic polyolefin, which enables good ionic transfer.

/RCS/: the recombination space consisted of a high-density polyethylene grid 1 mm thick, having a contact angle with the electrolyte of 70° and an average pore section of 3.5 $mm^2$.

The electrolyte was a concentrated mixture of sodium hydroxide, potassium hydroxide and lithium hydroxide. The quantity used was 56 cc, i.e. 2.24 cc/Ah. The dead volume was estimated at 0.8 cc/Ah.

The whole of the bundle was mounted in a polypropylene container. A lid carrying a relief valve (calibrated to 2 bar) was then heat-welded to the container.

The storage cell underwent an electrical training cycle. The increase in pressure on overcharging at C/10 was measured.

Several storage cells were made with different recombination devices. The data is set out in the table below (for overcharging at C/10). The term "angle" represents the wetting angle, i.e. the angle of contact with the electrolyte.

FIG. 2 shows the end of charge pressure as a function of dead volume for two RCS, one 0.2 mm thick and the other 0.8 mm thick. The relief valve was calibrated at 2 bar. The RCS was of high-density polyethylene, as in the table. Note that the end of charge pressure remained below 2 bar for the 0.2 mm thick RCS up to a dead volume of 1.5 cc/Ah, whereas the dead volume could be as small as 0.2 cc/Ah with the 0.8 mm thick RCS.

FIG. 3 shows the end of charge pressure as a function of the quantity of electrolyte for two RCS, one 0.2 mm thick and the other 0.8 mm thick. The relief valve was calibrated at 2 bar. The RCS was of high-density polyethylene, as in the table. Note that the end of charge pressure remained below 2 bar for the 0.2 mm thick RCS up to a quantity of 1.8 cc/Ah, whereas the quantity of electrolyte could rise to 2.5 cc/Ah with the 0.8 mm thick RCS.

FIG. 4 shows the end of charge pressure as a function of the thickness of the RCS. The relief valve was calibrated at 2 bar. The RCS was of high-density polyethylene as in the table. Note that the end of charge pressure remained below 3 bar for an RCS up to about 0.2 mm thick and less than 2 bar for an RCS up to about 0.3 mm thick.

The above values show that the invention provides a maintenance-free storage cell with low pressure, high capacity, high capacity per unit volume, a small dead volume and high quantity of electrolyte.

The invention is not limited to the embodiments described and lends itself to many variants that will be evident to the skilled person.

| Material | Thickness | Pore section | Quantity of electrolyte | Dead volume | Internal pressure at end of overcharging* | Service life** |
|---|---|---|---|---|---|---|
| HD PE (angle = 70°) | 1 mm | 3.5 mm$^2$ | 2.24 cc/Ah | 0.8 cc/Ah | 0.8 bar | 1 200 cycles |
| HD PE (angle = 70°) | 0.7 mm | 3.5 mm$^2$ | 2.24 cc/Ah | 0.8 cc/Ah | 1 bar | 1 200 cycles |
| HD PE (angle = 70°) | 0.5 mm | 3.5 mm$^2$ | 2.24 cc/Ah | 0.8 cc/Ah | 1.4 bar | 1 200 cycles |
| HD PE + hydrophobic surface treatment (angle > 90°) | 0.5 mm | 3.5 mm$^2$ | 2.24 cc/Ah | 0.8 cc/Ah | 1.2 bar | 1 200 cycles |
| PVC (angle < 45°) | 0.23 mm | ≈1200 $\mu$m$^2$ | 2.24 cc/Ah | 0.8 cc/Ah | >2 bar opening of relief valve*** | 530 cycles |

*pressure after 5 hours overcharging at C/10
**number of cycles for which the power is greater than 50% of the initial value for fast cycling (charge at C/3 k = 1.1, discharge at C, 80% of depth of discharge)
***rate of recombination in the case of the PVC system: 97%

There is claimed:

1. An aqueous alkaline electrolyte Ni-MH sealed secondary storage cell including a bundle of electrodes placed in a container and made up of a plurality of negative and positive electrodes, a space separating the negative electrodes from the positive electrodes containing a separator, in which cell said separator is permeable to gases and a recombination device is placed between two adjacent negative electrodes and has a wetting angle of at least 45°, an average pore section of at least $10^3$ $\mu$m$^2$, and a thickness from 0.2 mm to 5 mm and wherein said recombination device is electrically non-conductive.

2. The cell claimed in claim 1 wherein said wetting angle of said recombination device is at least 60°.

3. The cell claimed in claim 1 wherein said thickness of said recombination device is from 0.3 mm to 2 mm.

4. The cell claimed in claim 1 wherein said recombination device is made of polyethylene or polypropylene.

5. The cell claimed in claim 1 wherein said recombination device is surface-treated with PTFE.

6. The cell claimed in claim 1 having an operating pressure less than 2 bar.

7. The cell claimed in claim 1 having a dead volume less than 2 cc/Ah.

8. The cell claimed in claim 1 having a quantity of electrolyte greater than 1.8 cc/Ah.

9. The cell claimed in claim 1 having a capacity per unit volume greater than 100 Ah/l.

* * * * *